(12) United States Patent
Krasner et al.

(10) Patent No.: US 9,715,460 B1
(45) Date of Patent: Jul. 25, 2017

(54) ENABLING A FIRST VIRTUAL STORAGE DIRECTOR RUNNING IN A CONTAINER MAINTAINED BY A HYPERVISOR TO ACHIEVE DIRECT MEMORY ACCESS TO MEMORY OF A SECOND VIRTUAL STORAGE DIRECTOR RUNNING IN A DIFFERENT CONTAINER

(71) Applicant: EMC IP Holding Company LLC, Hopkinton, MA (US)

(72) Inventors: Jonathan Krasner, Coventry, RI (US); Steve McClure, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 19 days.

(21) Appl. No.: 14/962,052

(22) Filed: Dec. 8, 2015

(51) Int. Cl.
 *G06F 12/00* (2006.01)
 *G06F 12/109* (2016.01)
 *G06F 9/455* (2006.01)
 *G06F 9/50* (2006.01)

(52) U.S. Cl.
 CPC ........ *G06F 12/109* (2013.01); *G06F 9/45558* (2013.01); *G06F 9/45533* (2013.01); *G06F 9/5077* (2013.01); *G06F 2009/45583* (2013.01); *G06F 2201/815* (2013.01); *G06F 2212/657* (2013.01)

(58) Field of Classification Search
 CPC ............... G06F 12/109; G06F 9/45558; G06F 2212/657; G06F 2009/45583; G06F 2201/815; G06F 9/45533; G06F 9/5077
 USPC .................. 718/1; 711/6, 170, 173, 203, 202
 See application file for complete search history.

(56) References Cited

U.S. PATENT DOCUMENTS

| | | | |
|---|---|---|---|
| 8,990,520 B1 * | 3/2015 | Tang .................... | G06F 12/1072 711/154 |
| 9,137,102 B1 * | 9/2015 | Miller ................. | H04L 12/6418 |
| 2011/0185355 A1 * | 7/2011 | Chawla ................. | G06F 9/5077 718/1 |
| 2013/0138863 A1 * | 5/2013 | Tsirkin ................ | G06F 12/0284 711/6 |
| 2014/0082167 A1 * | 3/2014 | Robinson ............ | G06F 11/1458 709/223 |
| 2016/0359955 A1 * | 12/2016 | Gill ...................... | G06F 9/45558 |

* cited by examiner

*Primary Examiner* — Hong Kim
(74) *Attorney, Agent, or Firm* — Anderson Gorecki LLP (57) ABSTRACT

A driver enables a first virtual storage director running in a container maintained by a hypervisor to achieve direct memory access to memory of a second virtual storage director running in a different container. An address space is made available to the first virtual storage director. A first portion of the address space is associated with memory allocated to the first virtual storage director by the container. A second portion of the address space is mapped to memory allocated to the second virtual storage director.

20 Claims, 5 Drawing Sheets

ENABLING A FIRST VIRTUAL STORAGE
DIRECTOR RUNNING IN A CONTAINER
MAINTAINED BY A HYPERVISOR TO
ACHIEVE DIRECT MEMORY ACCESS TO
MEMORY OF A SECOND VIRTUAL
STORAGE DIRECTOR RUNNING IN A
DIFFERENT CONTAINER

BACKGROUND

Aspects of this disclosure are generally related to data storage systems that can be used to maintain relatively large data sets and support a relatively large number of concurrent users. A basic building block of data storage systems may include a storage server or a storage array. A data center may include clusters of storage servers or storage arrays. Multiple data centers may be used to implement a distributed and geographically diverse storage system.

SUMMARY

All examples, aspects and features mentioned in this document can be combined in any technically possible way.

In accordance with an aspect, an apparatus comprises: a computing node comprising: at least one processor; a non-transitory computer-readable memory; a first virtual storage director; a second virtual storage director; a hypervisor that maintains: a first container that allocates a first portion of the memory to the first virtual storage director; and a second container that allocates a second portion of the memory to the second virtual storage director; and a driver program that: maps address space that is available to the first virtual storage director to the second portion of the memory; and maps address space that is available to the second virtual storage director to the first portion of the memory. In some implementations the first virtual storage director utilizes the driver program to directly access the second portion of the memory allocated to the second virtual storage director. In some implementations the first virtual storage director locks locations in the second portion of the memory allocated to the second virtual storage director by locking locations of the available address space mapped to the second portion of the memory. In some implementations the first virtual storage director locks locations in the first portion of the memory allocated to the first virtual storage director by locking locations of available address space associated with the first portion of the memory. In some implementations the first virtual storage director writes to the locked locations in the second portion of the memory allocated to the second virtual storage director by writing to the locked locations of the available address space mapped to the second portion of the memory. In some implementations the first virtual storage director writes to the locked locations in the first portion of the memory allocated to the first virtual storage director by writing to the locked locations of available address space associated with the first portion of the memory. In some implementations the first virtual storage director releases locks on the locked locations in the second portion of the memory allocated to the second virtual storage director by releasing locks on the locked locations of the available address space mapped to the second portion of the memory. In some implementations the first virtual storage director releases locks on the locked locations in the first portion of the memory allocated to the first virtual storage director by releasing locks on the locked locations of available address space associated with the first portion of the memory. In some implementations the first and second virtual storage directors each comprise a virtual processor and a virtual backend adapter interfaced with a data storage device. In some implementations the apparatus comprises multiple ones of the computing node in a first data center and multiple ones of the computing node in a second data center.

In accordance with an aspect a method comprises: in a computing node comprising: at least one processor; a non-transitory computer-readable memory; a first virtual storage director; a second virtual storage director; a hypervisor; and a driver program: the hypervisor maintaining a first container that allocates a first portion of the memory to the first virtual storage director; the hypervisor maintaining a second container that allocates a second portion of the memory to the second virtual storage director; the driver mapping address space that is available to the first virtual storage director to the second portion of the memory; and the driver mapping address space that is available to the second virtual storage director to the first portion of the memory. In some implementations the method comprises the first virtual storage director utilizing the driver program to directly access the second portion of the memory allocated to the second virtual storage director. In some implementations the method comprises the first virtual storage director locking locations in the second portion of the memory allocated to the second virtual storage director by locking locations of the available address space mapped to the second portion of the memory. In some implementations the method comprises the first virtual storage director locking locations in the first portion of the memory allocated to the first virtual storage director by locking locations of available address space associated with the first portion of the memory. In some implementations the method comprises the first virtual storage director writing to the locked locations in the second portion of the memory allocated to the second virtual storage director by writing to the locked locations of the available address space mapped to the second portion of the memory. In some implementations the method comprises the first virtual storage director writing to the locked locations in the first portion of the memory allocated to the first virtual storage director by writing to the locked locations of available address space associated with the first portion of the memory. In some implementations the method comprises the first virtual storage director releasing locks on the locked locations in the second portion of the memory allocated to the second virtual storage director by releasing locks on the locked locations of the available address space mapped to the second portion of the memory. In some implementations the method comprises the first virtual storage director releasing locks on the locked locations in the first portion of the memory allocated to the first virtual storage director by releasing locks on the locked locations of available address space associated with the first portion of the memory. In some implementations the first and second virtual storage directors each comprise a virtual processor and a virtual backend adapter interfaced with a data storage device. In some implementations there are multiple ones of the computing node in a first data center and multiple ones of the computing node in a second data center.

DETAILED DESCRIPTION

Some aspects, features and implementations may comprise computer components and computer-implemented steps or processes that will be apparent to those of ordinary skill in the art. It should be understood by those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of physical processor devices. For ease of exposition, not every step, process or element is described herein as part of a computer system. However, those of ordinary skill in the art will recognize steps, processes and elements that may have a corresponding computer system or software component. Such computer system and software components are therefore enabled by describing their corresponding steps, processes or elements, and are within the scope of the disclosure. When corresponding physical and non-physical elements are described herein, modifiers including but not limited to "logical," "virtual" and "emulated" are used to refer to non-physical elements and the absence of such modifiers is used to refer to corresponding physical elements. For example, a "logical device" is non-physical and a "device" is physical. It should also be understood that non-physical elements are not merely abstract concepts but rather are implemented with physical elements. For example, a logical storage device is backed by one or more physical storage devices where the logical storage device may represent a layer of abstraction between the logical device and the physical storage devices.

Figure 1:
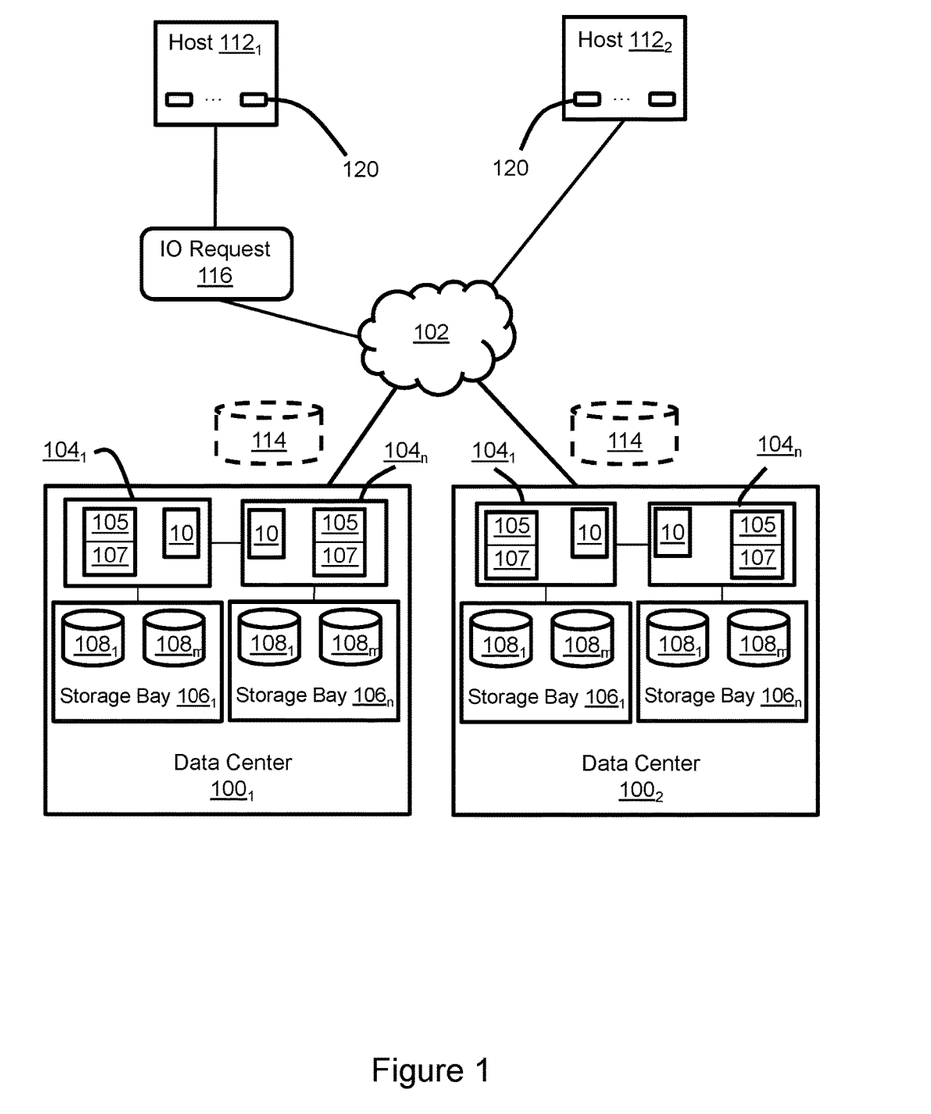
FIG. 1 illustrates an exemplary data storage system based on virtual storage arrays hosted by computing nodes.

FIG. 1 illustrates a distributed data storage system that may maintain data and support IOs associated with a large number of concurrent users. The data storage system includes one or more data centers $100_1$, $100_2$. Different data centers are interconnected via a network 102. For context and without limitation the network 102 could be a WAN (wide area network) or MAN (metropolitan area network). Each data center $100_1$, $100_2$ includes one or more computing nodes $104_1$-$104_n$. The computing nodes may be servers or special purpose hardware platforms, e.g., mounted in racks or in a chassis, for example and without limitation. Each computing node $104_a$-$104_n$ includes processor resources 105 and memory resources 107. For context and without limitation, the processor resources may include one or more multi-core processors including CPUs and GPUs, and the memory resources may include volatile memory components such as RAM (random access memory) chips. Within each data center each computing node may be connected to each other computing node via point-to-point communication links. The links may be associated with a switch or fabric. Each computing node is associated with a corresponding storage bay $106_1$-$106_n$. Each storage bay includes multiple data storage devices $108_1$-$108_m$. The data storage devices $108_1$-$108_m$ may include pools of different types of non-volatile data storage devices which are organized into hierarchical tiers. For example and without limitation, the data storage devices may include a storage pool of flash drives at tier 0, a storage pool of FC (Fibre Channel) drives at tier 1, and a storage pool of SATA (serial advanced technology attachment) drives at tier 2.

Each computing node $104_1$-$104_n$ hosts at least one virtual storage server cluster or virtual storage array 10 (hereafter reference will simply be made to virtual storage arrays). The virtual storage array provides an abstraction layer between external host devices $112_1$, $112_2$ and the "backend storage" of the storage bays $106_1$-$106_n$. An external device such as a user terminal or server may use the data storage system by communicating with one of the external host devices $112_1$, $112_2$. Multiple external host devices may be associated with each data center, and each external host device may host any of a wide variety of applications. An exemplary external host device may be a type of server which hosts one or more instances of client applications 120 such as a database, file server or block server, for example and without limitation, and for which the corresponding data is maintained by the data storage system. A communication between the external device and the instance of the application 120 may prompt a corresponding IO request 116. For example, an instance of application 120 on external host $112_1$ may send IO request 116 to one of the data centers $100_1$, $100_2$ in order to read or write data. Any of the computing nodes $104_1$-$104_n$ can receive and process IO requests, e.g., by writing data to the physical storage devices or reading data from the physical storage devices and sending the data to the host. The application and the external host device will typically be unaware of the actual location of data on the physical storage devices $108_1$-$108_m$. The IO requests reference one or more locations in a logical volume 114, of which there may be a plurality, e.g. and without limitation one per hosted client application. The data stored on each logical volume may be distributed across multiple physical storage devices $108_1$-$108_m$ and possibly mirrored by each data center. Extents of the data may be moved between physical storage devices in response to data tiering decisions and other factors. For example, frequently accessed data may be moved to a higher tier and infrequently accessed data may be moved to a lower tier. Each virtual storage array 10 maintains or has access to mappings between the logical storage device 114 and the physical storage devices $108_1$-$108_m$. The mappings indicate which pages are in the volatile memory 107 of the computing node and where pages are located in backend storage of the associated storage bay. Requested data may be copied from backend storage to the volatile memory when a read is performed, and copied from volatile memory to backend storage when a write is performed. Thus, data that is present in volatile memory may be accessed directly from volatile memory.

Figure 2:
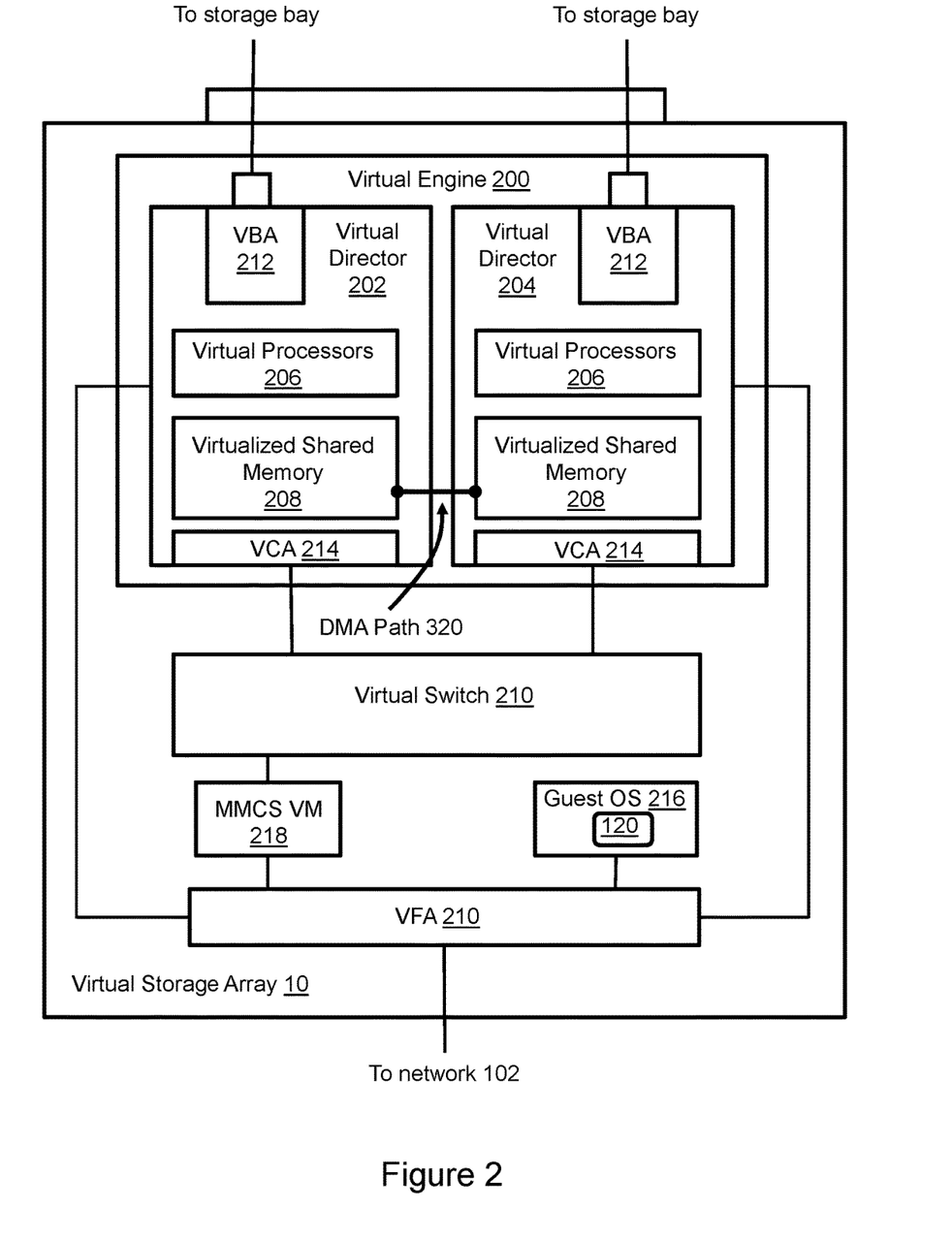
FIG. 2 illustrates an implementation of a virtual storage array.

FIG. 2 illustrates one possible implementation of the virtual storage array 10. Various virtual components are implemented and backed by the processor resources (105 FIG. 1) and memory resources (107 FIG. 1) of the computing node that hosts the virtual storage array. In the illustrated example the virtual storage array 10 includes one virtual storage engine 200. However, multiple virtual storage engines could be implemented in the same virtual storage array. Each virtual storage engine 200 includes a pair of virtual storage directors 202, 204. Each virtual storage director includes virtual processor resources 206, a virtualized shared memory (cache) 208, a VBA (virtual back end adapter) 212, and a VCA (virtual channel adapter) 214, each of which may be implemented by a corresponding thread running on the computing node. The virtual processor resources 206 may include, for example and without limitation, allocated cores of corresponding CPUs and GPUs of the processor resources of the computing node. The virtualized shared memory 208 could be backed by, for example and without limitation, a portion of the memory resources of the computing node. A virtual switch 210 may provide point-to-point connectivity between the virtual directors 202, 204. The virtual switch may be implemented as a virtual Ethernet switch, although a wide variety of communications protocols could be implemented. A VFA (virtual front end adapter) 210 is configured to interface the virtual directors 202, 204 with external devices. The VFA also interconnects the virtual directors 202, 204 with a guest OS (virtual host) 216, including hosted application 120, and a MMCS VM (management module control station virtual machine) 218. The MMCS VM is also reachable via the virtual switch 110.

The virtual components enable the virtual storage array 10 to emulate operation of a non-virtual (physical) storage array. The virtual processors 206 run a variety of threads on the instance of the virtual storage engine 200. The threads are configured to cause the virtual directors 202, 204 to perform IOs and other functions. The VBAs 212 interface with the back end physical storage devices of the associated storage bay in support of IOs and other functions. For example, the VBAs read data from and write data to the back end storage devices of the storage bay. Each VCA 214 may include one or more virtual ports, e.g. and without limitation, a pair of virtual Ethernet ports, via which other virtual directors of the same or other virtual storage engines of the same virtual storage array can be reached via the virtual switch 210. The virtualized shared memory 208 includes a cache slots section which is allocated for temporarily storing data that is being written to or read from the storage bay via the VBA 212. For example, data that is being written by an external or virtual host device is initially copied to the virtualized shared memory 208 and subsequently destaged to the storage bay. Data that is being read by an external host device or virtual host device is copied from the storage bay to virtualized shared memory 208 via the VBA and then provided to the external host or virtual host via the VFA. The VFA also helps to present the logical storage device 114 (FIG. 1) to external hosts and virtual hosts, receives IO requests from application instances 120, and provides data to external hosts and virtual hosts in response to read requests. Data may be also copied to the virtualized shared memory from the back end storage devices in response to a hint.

Figure 3:
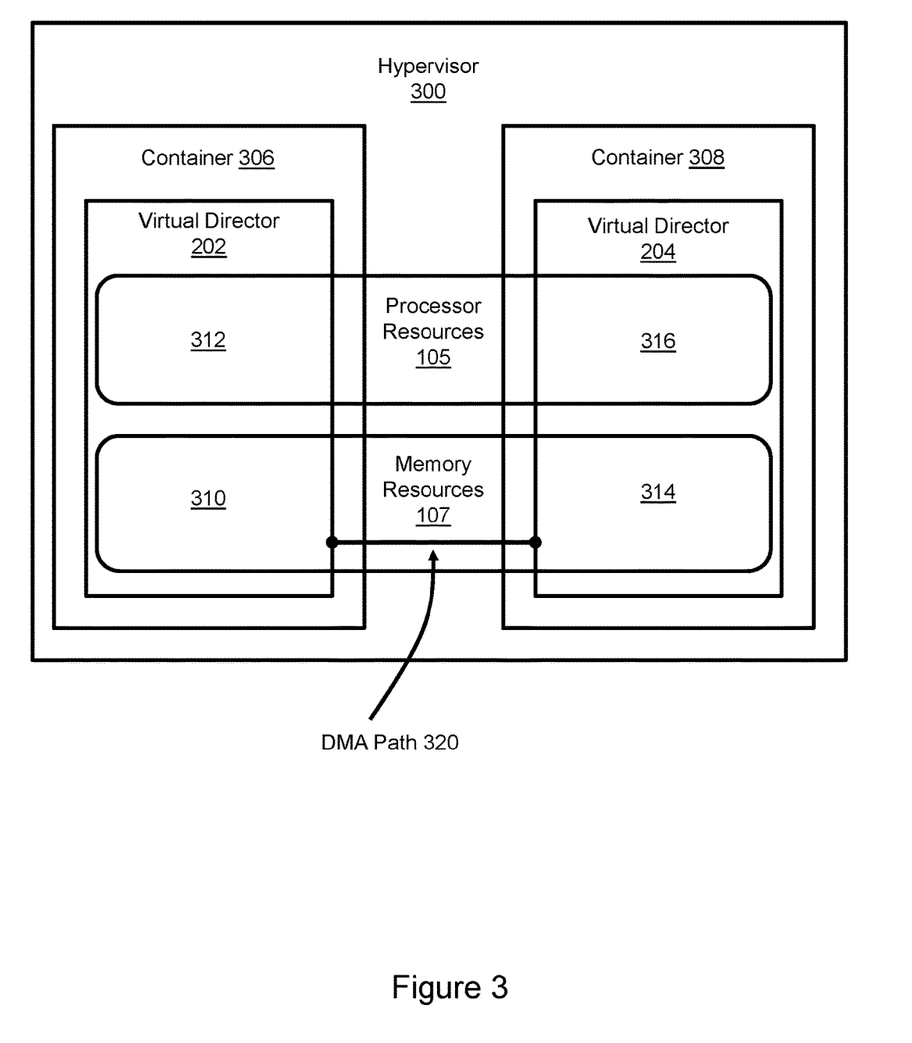
FIG. 3 illustrates hypervisor management of memory and processing resources for virtual storage directors.

Referring to FIGS. 2 and 3, a hypervisor 300 running on the computing node manages sharing of the processor resources 105 and memory resources 107 of the computing node among the virtual storage directors 202, 204. Each virtual storage director is a type of VM ("virtual machine"), sometimes referred to as a "Guest OS" (operating system). The hypervisor 300 implements separate containers 306, 308 that are uniquely associated with each respective virtual storage director 202, 204. Each container limits the virtual storage director with which it is associated to a specific portion of the processor resources 105 and memory resources 107. For example, container 306 limits virtual storage director 202 to an allocated portion 310 of the memory resources and an allocated set 312 of the processor cores. Similarly, container 308 limits virtual storage director 204 to a different allocated portion 314 of the memory resources and a different allocated set 316 of the processor cores. Thus, the virtual processors 206 of virtual director 202 are backed by allocated processors 312 and the virtualized shared memory 208 of virtual director 202 is backed by the allocated portion 310 of memory. Similarly, the virtual processors 206 of virtual director 204 are backed by allo-cated processors 316 and the virtualized shared memory 208 of virtual director 204 is backed by the allocated portion 314 of memory.

In general, a virtual machine is not aware of processor and memory resources that are outside the scope of the container in which the virtual machine is contained. The virtualized shared memory 208 of the virtual directors 202, 204 can be shared via the virtual switch 210. However, a more efficient direct memory access between virtual directors 202, 204 can be provided via a DMA (direct memory access) path 320 that traverses the container boundaries, e.g., a direct link between the virtualized shared memories which does not traverse the virtual switch. The DMA path is supported by a network protocol driver that is available to the virtual directors.

Figure 4:
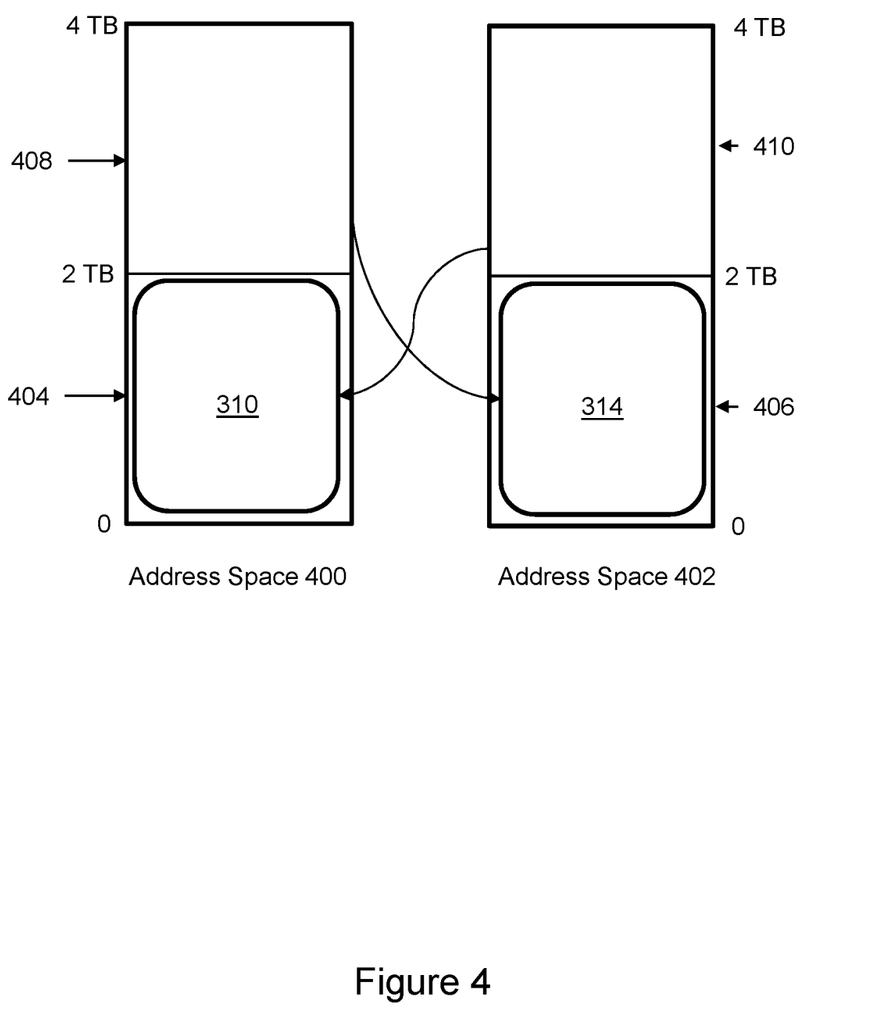
FIG. 4 illustrates inter-container direct memory access between virtual storage directors operating in different containers.
Figure 5:
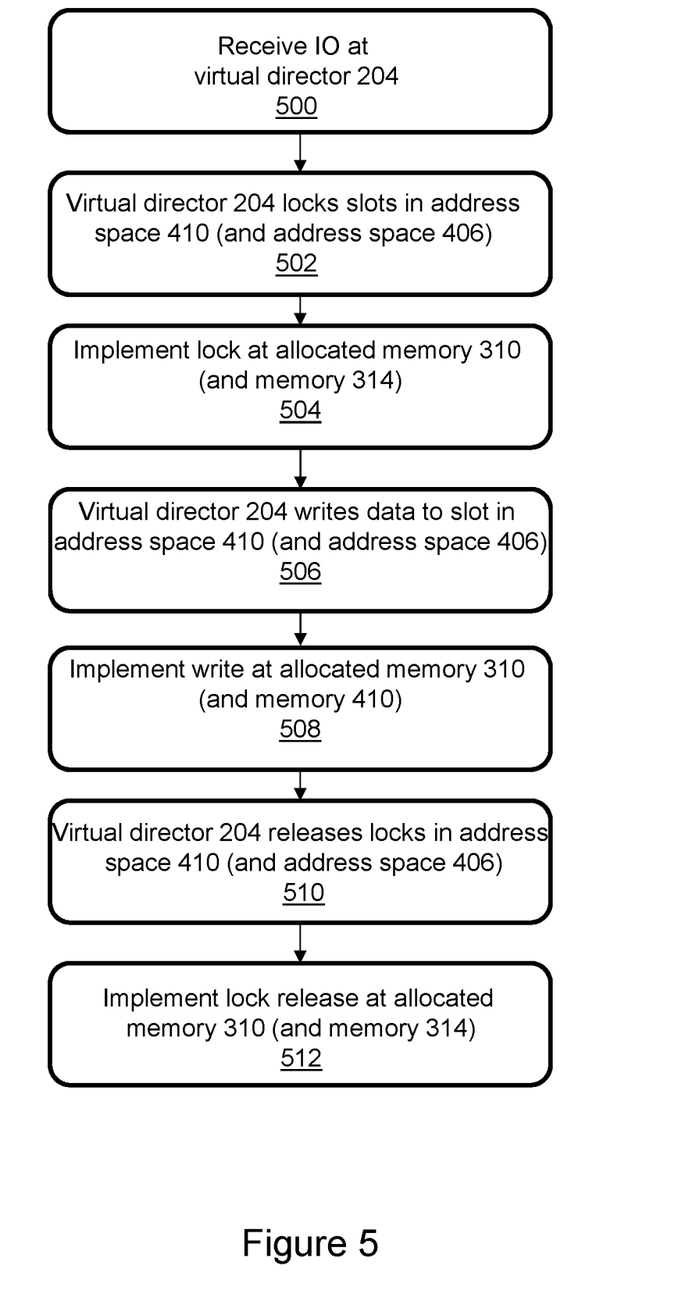
FIG. 5 is a flow diagram associated with a driver for inter-container direct memory access.

FIG. 4 illustrates an implementation of the DMA path that traverses the container boundaries. With reference to FIGS. 2 through 4, address space 400 represents the range of memory addresses available to virtual director 202. Address space 402 represents the range of memory addresses available to virtual director 204. For context and without limitation each address space is shown as encompassing 4 TB of the memory of the computing node. Those of ordinary skill in the art will understand that a wide variety of memory allocations and address ranges are possible. Within address space 400 a 2 TB portion 404 of address space is mapped to allocated portion 310 of the memory resources. Within address space 402, a 2 TB portion 406 of address space is mapped to allocated portion 314 of the memory resources. A second 2 TB portion 408 of address space within the address space 400 is mapped to allocated portion 314 of memory resources. A second 2 TB portion 410 of the address space within address space 402 is mapped to allocated portion 310 of memory resources. Thus, there is a correspondence between address space 404 and address space 410. Similarly, there is a correspondence between address space 408 and address space 406. However, the allocated memory 314 to which address space 408 is mapped is outside container 306. Similarly, the allocated memory 310 to which address space 410 is mapped is outside container 308. Consequently, zero-copy direct memory access operations can be implemented across container boundaries.

Operation of the network protocol driver program that implements the DMA path 320 will now be described with reference to FIGS. 2 through 5. At 500 an IO is received at virtual director 204. For purposes of explanation the IO will be described as a write operation. At 502 virtual director 204 locks a range of addresses, e.g. a slot, in address space 410. The lock might be accomplished by writing a value to some part of the memory associated with address space 410. Because address space 410 is mapped to allocated portion 310 of memory resources, the lock is implemented on allocated portion 310 of memory resources as indicated at 504. At 506 virtual director 204 writes the data to the locked range of addresses in address space 410. Because address space 410 is mapped to allocated portion 310 of memory resources, the write is implemented on allocated portion 310 of memory resources as indicated at 508. At 510 virtual director 204 releases the lock. Release of the lock on the address space 410 causes release of the lock on allocated portion 310 of memory resources as indicated at 512. In the case of a read operation a read to address space 410 would prompt retrieval of data from memory portion 310.

In some implementations corresponding locks and writes would be made by virtual director 204 on both address space 406 and address space 410. These actions are shown parenthetically in FIG. 5. In particular, at 502 virtual director 204 also locks slots in address space 406. At 504 the locks are also implemented in memory 314. At 506 the data is also written to address space 406. At 508 the write is also implemented in memory 410. At 510 the locks are also released in address space 406. At 512 the lock release is also implemented in memory 314.

Although aspects have been described with reference to virtual storage directors it should be understood by those of ordinary skill in the art that the concepts can be implemented with other types of VMs and Guest OSs. Thus the techniques may be employed to enable RDMA (remote direct memory access) from the memory of one computer into the memory of another computer without involving either computer's operating system. For example, zero-copy networking can be accomplished by enabling a virtual network adapter to transfer data directly to or from application memory. When an application performs an RDMA read or write request, the application data is delivered directly to the network, thus reducing latency and enabling fast message transfer. The term "driver" is therefore used broadly herein to refer to any of a wide variety of computer programs.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a computing node comprising:
        at least one processor;
        a non-transitory computer-readable memory;
        a first virtual storage director;
        a second virtual storage director;
        a hypervisor that maintains:
            a first container that allocates a first portion of the memory to the first virtual storage director; and
            a second container that allocates a second portion of the memory to the second virtual storage director; and
        a driver program that:
            maps address space that is available to the first virtual storage director to the second portion of the memory; and
            maps address space that is available to the second virtual storage director to the first portion of the memory.

2. The apparatus of claim 1 wherein the first virtual storage director utilizes the driver program to directly access the second portion of the memory allocated to the second virtual storage director.

3. The apparatus of claim 2 wherein the first virtual storage director locks locations in the second portion of the memory allocated to the second virtual storage director by locking locations of the available address space mapped to the second portion of the memory.

4. The apparatus of claim 3 wherein the first virtual storage director locks locations in the first portion of the memory allocated to the first virtual storage director by locking locations of available address space associated with the first portion of the memory.

5. The apparatus of claim 4 wherein the first virtual storage director writes to the locked locations in the second portion of the memory allocated to the second virtual storage director by writing to the locked locations of the available address space mapped to the second portion of the memory.

6. The apparatus of claim 5 wherein the first virtual storage director writes to the locked locations in the first portion of the memory allocated to the first virtual storage director by writing to the locked locations of available address space associated with the first portion of the memory.

7. The apparatus of claim 6 wherein the first virtual storage director releases locks on the locked locations in the second portion of the memory allocated to the second virtual storage director by releasing locks on the locked locations of the available address space mapped to the second portion of the memory.

8. The apparatus of claim 7 wherein the first virtual storage director releases locks on the locked locations in the first portion of the memory allocated to the first virtual storage director by releasing locks on the locked locations of available address space associated with the first portion of the memory.

9. The apparatus of claim 1 wherein the first and second virtual storage directors each comprise a virtual processor and a virtual backend adapter interfaced with a data storage device.

10. The apparatus of claim 1 comprising multiple ones of the computing node in a first data center and multiple ones of the computing node in a second data center.

11. A method comprising:
    in a computing node comprising: at least one processor; a non-transitory computer-readable memory; a first virtual storage director; a second virtual storage director; a hypervisor; and a driver program:
        the hypervisor maintaining a first container that allocates a first portion of the memory to the first virtual storage director;
        the hypervisor maintaining a second container that allocates a second portion of the memory to the second virtual storage director;
        the driver mapping address space that is available to the first virtual storage director to the second portion of the memory; and
        the driver mapping address space that is available to the second virtual storage director to the first portion of the memory.

12. The method of claim 11 comprising the first virtual storage director utilizing the driver program to directly access the second portion of the memory allocated to the second virtual storage director.

13. The method of claim 12 comprising the first virtual storage director locking locations in the second portion of the memory allocated to the second virtual storage director by locking locations of the available address space mapped to the second portion of the memory.

14. The method of claim 13 comprising the first virtual storage director locking locations in the first portion of the memory allocated to the first virtual storage director by locking locations of available address space associated with the first portion of the memory.

15. The method of claim 14 comprising the first virtual storage director writing to the locked locations in the second portion of the memory allocated to the second virtual storage director by writing to the locked locations of the available address space mapped to the second portion of the memory.

16. The method of claim 15 comprising the first virtual storage director writing to the locked locations in the first portion of the memory allocated to the first virtual storage director by writing to the locked locations of available address space associated with the first portion of the memory.

17. The method of claim 16 comprising the first virtual storage director releasing locks on the locked locations in the second portion of the memory allocated to the second virtual storage director by releasing locks on the locked locations of the available address space mapped to the second portion of the memory.

18. The method of claim 17 comprising the first virtual storage director releasing locks on the locked locations in the first portion of the memory allocated to the first virtual storage director by releasing locks on the locked locations of available address space associated with the first portion of the memory.

19. The method of claim 18 wherein the first and second virtual storage directors each comprise a virtual processor and a virtual backend adapter interfaced with a data storage device.

20. The method of claim 19 comprising multiple ones of the computing node in a first data center and multiple ones of the computing node in a second data center.

* * * * *